US009761005B2

(12) United States Patent
Tahmasebi Maraghoosh et al.

(10) Patent No.: US 9,761,005 B2
(45) Date of Patent: Sep. 12, 2017

(54) METHOD AND SYSTEM FOR MESH SEGMENTATION AND MESH REGISTRATION

(71) Applicant: KONINKLIJKE PHILIPS N.V., Eindhoven (NL)

(72) Inventors: Amir Mohammad Tahmasebi Maraghoosh, Ridgefield, CT (US); Jochen Kruecker, Washington, DC (US); Lyubomir Georgiev Zagorchev, Burlington, MA (US)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/785,438

(22) PCT Filed: May 8, 2014

(86) PCT No.: PCT/IB2014/061288
§ 371 (c)(1),
(2) Date: Oct. 19, 2015

(87) PCT Pub. No.: WO2014/181278
PCT Pub. Date: Nov. 13, 2014

(65) Prior Publication Data
US 2016/0078633 A1     Mar. 17, 2016

Related U.S. Application Data

(60) Provisional application No. 61/821,279, filed on May 9, 2013.

(51) Int. Cl.
*G06K 9/00*     (2006.01)
*G06T 7/00*     (2017.01)
(Continued)

(52) U.S. Cl.
CPC ............. *G06T 7/0089* (2013.01); *G06K 9/46* (2013.01); *G06T 3/0068* (2013.01); *G06T 7/149* (2017.01);
(Continued)

(58) Field of Classification Search
CPC .............. G06T 7/00; G06K 9/00; A61B 17/00
(Continued)

(56) References Cited

U.S. PATENT DOCUMENTS

| 8,942,455 | B2 * | 1/2015 | Chou | G06T 7/344 382/131 |
| 2009/0324041 | A1 * | 12/2009 | Narayanan | G06K 9/00986 382/131 |
| 2012/0155734 | A1 * | 6/2012 | Barratt | G06T 7/0032 382/131 |
| 2013/0070995 | A1 * | 3/2013 | Chou | G06T 7/0032 382/131 |
| 2016/0078633 | A1 | 3/2016 | Tahmasebi Maraghoosh et al. | |

OTHER PUBLICATIONS

Martin, S. et al "MR prior based automatic segmentation of the prostate in TRUS images for MR/TRUS data fusion", Biomedical Imaging: From Nano to Macro, 2010 IEEE International Symposium on IEEE, NJ, (2010), pp. 640-643.

(Continued)

*Primary Examiner* — Abolfazl Tabatabai (57) ABSTRACT

A system, apparatus and method for mesh registration including an extraction of a preoperative anatomical mesh from a preoperative anatomical image based on a base topology of an anatomical mesh template, an extraction of an intraoperative anatomical mesh from an intraoperative anatomical image based on a preoperative topology of the preoperative anatomical mesh derived from the base topology of an anatomical mesh template, and a registration of the preoperative anatomical image and the intraoperative anatomical image based on a mapping correspondence between the preoperative anatomical mesh and the intraoperative anatomical mesh established by an intraoperative topology of the intraoperative anatomical mesh derived from the preoperative topology of the preoperative anatomical mesh.

16 Claims, 4 Drawing Sheets

(51) Int. Cl.
*G06K 9/46* (2006.01)
*G06T 3/00* (2006.01)
*G06T 17/20* (2006.01)
*G06T 7/33* (2017.01)
*G06T 7/149* (2017.01)
*G06T 7/174* (2017.01)
*A61B 1/00* (2006.01)

(52) U.S. Cl.
CPC .............. *G06T 7/174* (2017.01); *G06T 7/33* (2017.01); *G06T 7/344* (2017.01); *G06T 17/20* (2013.01); *G06T 2207/10081* (2013.01); *G06T 2207/10088* (2013.01); *G06T 2207/10132* (2013.01); *G06T 2207/10136* (2013.01); *G06T 2207/20081* (2013.01); *G06T 2207/30004* (2013.01); *G06T 2207/30056* (2013.01)

(58) Field of Classification Search
USPC ......... 382/128–134, 164, 172, 177; 600/141, 600/516
See application file for complete search history.

(56) References Cited

OTHER PUBLICATIONS

Castellano-Smith, A.D. et al, "Constructing Patient Specific Models for Correcting Intraoperative Brain Deformation", In: "Field Programmable Logic and Application", (2001), Springer Berlin Heidelberg, Berlin, vol. 2208, pp. 1091-1098.

Dumpuri, P et al, "Model-updated image-guided liver surgery: preliminary results using surface characterization", Progress in Biophysics and Molecular Biology, Pergamon Press, GB, vol. 103, No. 2-3, (2010), pp. 197-307.

Hu, Y. et al. "MR to ultrasound registration for image-guided prostate interventions", Medical Image Analysis 16 (2012) 687-703.

Kadoury, S. et al. "A model-based registration approach of preoperative MRI with 3D ultrasound of the liver for interventional guidance procedures", Biomedical Imaging (ISBI), 2012 9th IEEE International Symposium, May 2-5, 2012 in Barcelona, pp. 952-955.

Ecabert, O. et al. "Automatic Model based segmentation of the heart in CT images", IEEE Trans. Med. Imag., 27(9)1189-1201, 2008.

\* cited by examiner

METHOD AND SYSTEM FOR MESH SEGMENTATION AND MESH REGISTRATION

CROSS-REFERENCE TO PRIOR APPLICATIONS

This application is the U.S. National Phase application under 35 U.S.C. §371 of International Application Serial No. PCT/IB2014/061288, filed on May 8, 2014, which claims the benefit of U.S. Application Ser. No. 61/821,279, filed on May 9, 2013. These applications are hereby incorporated by reference herein.

The present invention generally relates to image segmentation of a preoperative anatomical image (e.g., a computed tomography ("CT") scan or a magnetic resonance ("MR") imaging scan of an anatomy) and of an intraoperative anatomical image (e.g., ultrasound ("US") image frames of an anatomy) to facilitate a reliable registration of the preoperative anatomical image and the intraoperative anatomical image. The present invention specifically relates to an anatomical mesh template for an extraction of anatomical meshes from a preoperative anatomical image and an intraoperative anatomical image whereby the anatomical meshes have a mapping correspondence for registering the anatomical images.

A fusion of a preoperative anatomical image with an intraoperative anatomical image has been utilized to facilitate image-guided interventional/surgical/diagnostic procedures. One well-known scenario is the fusion of high-resolution preoperative CT or MR scans with intraoperative ultrasound image frames. For example, conventional two-dimensional ("2D") ultrasound systems may be equipped with position sensors (e.g., electromagnetic tracking sensors) to acquire tracked 2D sweeps of an organ. Using the tracking information obtained during the image acquisition, the 2D sweep US frames are aligned with respect to a reference coordinate system to reconstruct a three-dimensional ("3D") volume of the organ. Ultrasound is ideal for intraoperative imaging of the organ, but has a poor image resolution for image guidance. The fusion of the ultrasound imaging with other high-resolution imaging modalities (e.g., CT or MR) has therefore been used to improve ultrasound-based guidance for interventional/surgical/diagnostic procedures. During the image fusion, the target organ is precisely registered between the intraoperative ultrasound and the preoperative modality. While, many image registration techniques have been proposed for the fusion of two different modalities, a fusion of an intraoperative ultrasound with any preoperative modality (e.g., CT or MR) has proven to be challenging due to lack of a functional dependency between the intraoperative ultrasound and the preoperative modality.

More particularly, a known diaphragm surface model based solution for the fusion of a preoperative 3D CT imaging scan of a liver to intraoperative US image frames of the liver involves a registration of 3D shape segmentation of the liver obtained from the preoperative 3D CT imaging scan to an extracted 3D liver diaphragm surface model of the liver acquired from a 2D ultrasound sweep or a single 3D ultrasound volume acquisition. The surface segmentation of the diaphragm in the intraoperative ultrasound image adapts a population average mesh model to the ultrasound image using image-based features. This can present a challenge and as a result, the image registration accuracy significantly depends on the accuracy of the ultrasound segmentation.

As an alternative to the diaphragm surface model based approach, the present invention provides a mesh segmentation and a mesh registration of a preoperative anatomical image and an intraoperative anatomical image, particularly for image-guided interventional/surgical/diagnostic procedures.

One form of the present invention is a system for mesh segmentation and mesh registration. The system employs a preoperative workstation (e.g., a CT workstation or a MRI workstation) and an intraoperative workstation (e.g., an ultrasound workstation). In operation, the preoperative workstation extracts a preoperative anatomical mesh from a preoperative anatomical image (e.g., a CT liver image or a MR liver image) based on a base topology of the anatomical mesh template. Based on a preoperative topology of the extracted preoperative anatomical mesh derived from the base topology of the anatomical mesh template, the intraoperative workstation extracts an intraoperative anatomical mesh from an intraoperative anatomical image (e.g., an ultrasound liver image) and registers the preoperative anatomical image and the intraoperative anatomical image based on a mapping correspondence between the preoperative anatomical mesh and the intraoperative anatomical mesh established by an intraoperative topology of the intraoperative anatomical mesh derived from the preoperative topology of the preoperative anatomical mesh.

A second form of the present invention is a modular network for mesh segmentation and mesh registration. The system employs a preoperative mesh extractor, an intraoperative mesh extractor and a mesh spatial transformer. In operation, the preoperative mesh extractor extracts a preoperative anatomical mesh from a preoperative anatomical image (e.g., a CT liver image or a MR liver image) based on a base topology of an anatomical mesh template. The intraoperative mesh extractor extracts an intraoperative anatomical mesh from an intraoperative anatomical image (e.g., an ultrasound liver image) based on a preoperative topology of the preoperative anatomical mesh derived from the base topology of the anatomical mesh template. The mesh spatial transformer registers the preoperative anatomical image and the intraoperative anatomical image based on a mapping correspondence between the preoperative anatomical mesh and the intraoperative anatomical mesh established by an intraoperative topology of the intraoperative anatomical mesh derived from the preoperative topology of the preoperative anatomical mesh.

A third form of the present invention is a method for mesh segmentation and mesh registration. The method involves an extraction of a preoperative anatomical mesh from a preoperative anatomical image (e.g., a CT liver image or a MR liver image) based on a base topology of an anatomical mesh template, an extraction of an intraoperative anatomical mesh of the anatomical region from an intraoperative anatomical image (e.g., an ultrasound liver image) based on a preoperative topology of the preoperative anatomical mesh derived from the base topology of the anatomical mesh template, and a registration of the preoperative anatomical image and the intraoperative anatomical image based on a mapping correspondence between the preoperative anatomical mesh and the intraoperative anatomical mesh established by an intraoperative topology of the intraoperative anatomical mesh derived from the preoperative topology of the preoperative anatomical mesh.

The foregoing forms and other forms of the present invention as well as various features and advantages of the present invention will become further apparent from the following detailed description of various embodiments of the present invention read in conjunction with the accompanying drawings. The detailed description and drawings are merely illustrative of the present invention rather than limiting, the scope of the present invention being defined by the appended claims and equivalents thereof.

The present invention utilizes a base topology of an anatomical mesh template for an initialization of a mesh segmentation and a mesh registration of a preoperative anatomical image and of an intraoperative anatomical image.

For purposes of the present invention, the terms "anatomical", "mesh", "model", "extraction", "construction", "segmentation", "registration" and "transformation" as well as related terms are to be broadly interpreted as known in the art of the present invention.

Also for purposes of the present invention, irrespective of an occurrence of an imaging activity or operation of an imaging system, the term "preoperative" as used herein is broadly defined to describe any imaging activity or structure of a particular imaging modality designated as a preparation or a secondary imaging modality in support of an interventional/surgical/diagnostic procedure, and the term "intraoperative" as used herein is broadly defined to describe as any imaging activity or structure of a particular imaging modality designated as a primary imaging modality during an execution of an interventional/surgical/diagnostic procedure. Examples of imaging modalities include, but are not limited to, CT, MRI, X-ray and ultrasound.

In practice, the present invention applies to any anatomical regions (e.g., head, thorax, pelvis, etc.) and anatomical structures (e.g., bones, organs, circulatory system, digestive system, etc.), any type of preoperative anatomical image and any type of intraoperative anatomical image. Also in practice, the preoperative anatomical image and the intraoperative anatomical image may be of an anatomical region/structure of a same subject or of different subjects of an interventional/surgical/diagnostic procedure, and the preoperative anatomical image and the intraoperative anatomical image may be generated by the same imaging modality or different image modalities (e.g., preoperative CT-intraoperative US, preoperative CT-intraoperative CT, preoperative MRI-intraoperative US, preoperative MRI-intraoperative MRI and preoperative US-intraoperative US).

To facilitate an understanding of the present invention, exemplary embodiments of the present invention will be provided herein directed to the use of a base topology of a liver mesh template for an initialization of a mesh segmentation and a mesh registration of a preoperative CT/MR liver image and an intraoperative ultrasound liver image. The term "CT/MR" is used herein to denote the alternative use of CT imaging or MR imaging.

Figure 1:
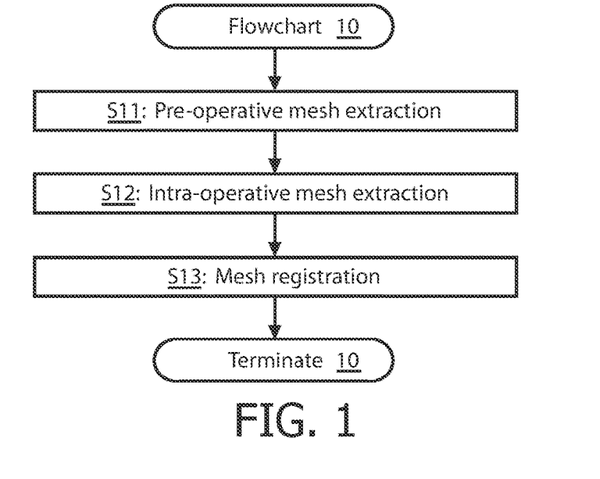
FIG. 1 illustrates a flowchart representative of an exemplary embodiment of a method for mesh segmentation and mesh registration in accordance with the present invention.

Referring to FIG. 1, a flowchart 10 represents a method for a mesh segmentation and a mesh registration of the present invention. A stage S11 of flowchart 10 encompasses a base topology of an anatomical mesh template serving as a basis for an extraction of a preoperative anatomical mesh from a preoperative anatomical image of a subject. More particularly, the anatomical mesh template has a known topology consisting of a fixed number of nodes and faces that are utilized in conjunction with anatomical features illustrated in the preoperative anatomical image to extract the preoperative anatomical mesh from the preoperative anatomical image with the same topology as the anatomical mesh template.

Figure 2:
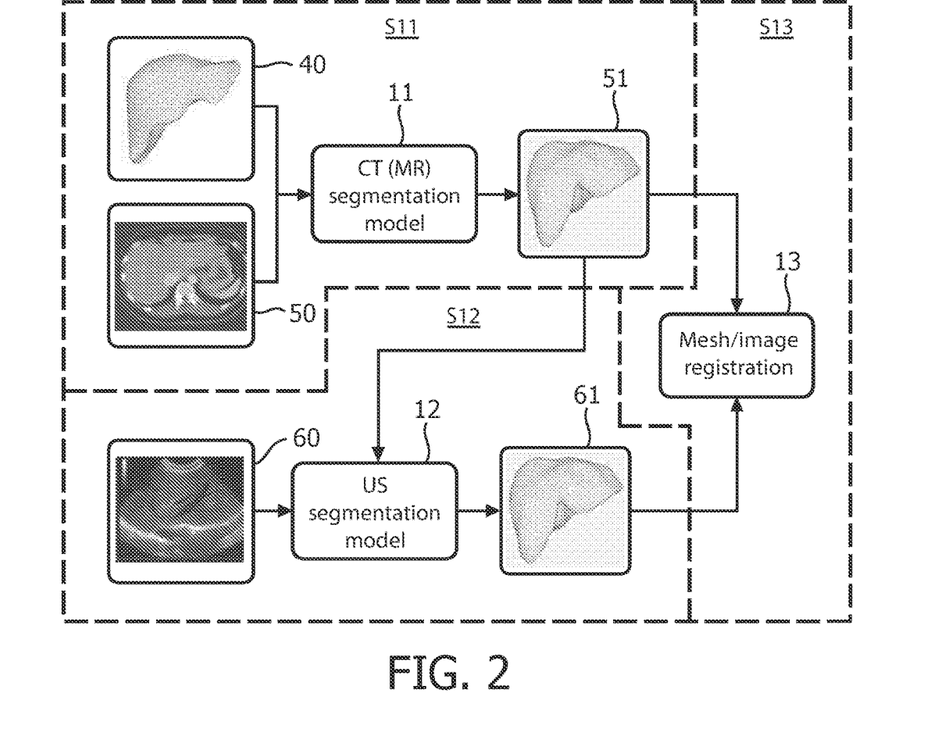
FIG. 2 illustrates an exemplary implementation of the flowchart illustrated in FIG. 1.

In practice, any technique(s) may be implemented during stage S11 for the extraction of the preoperative anatomical mesh from the preoperative anatomical image based on the base topology of the anatomical mesh template. In one embodiment of stage S11 as shown in FIG. 2, a CT/MR segmentation model 11 semi-automatically fits a liver mesh template 40 of a known base topology to image features (e.g., surface boundaries) of a CT/MR liver image 50 for an extraction of a CT/MR liver mesh 51 from CT/MR liver image 50.

A stage S12 of flowchart 10 encompasses a preoperative topology of the preoperative anatomical mesh extracted during stage S11 serving as a basis for an extraction of an intraoperative anatomical mesh from an intraoperative anatomical image of the same subject during stage S11 or a different subject from stage S11. More particularly, the preoperative anatomical mesh extracted during stage S11 will have the same known topology as the anatomical mesh template and known topology of the preoperative anatomical mesh is utilized in conjunction with anatomical features of the intraoperative anatomical image to extract the intraoperative anatomical mesh with the same topology as the anatomical mesh template and the preoperative anatomical mesh.

In practice, any technique(s) may be implemented during stage S12 for the extraction of the intraoperative anatomical mesh from the intraoperative anatomical image based on the preoperative topology of the preoperative anatomical mesh. In one embodiment of stage S12 as shown in FIG. 2, an ultrasound segmentation model 12 adaptively spatially transforms a CT/MR liver mesh 51 of the known topology to an ultrasound liver image 60. The adaptive spatial transform may have limited degrees of freedom (e.g., a rigid, an affine or an elastic deformable transformation). After the spatial transformation, ultrasound segmentation model 12 semi-automatically fits CT/MR liver mesh 51 to image features (e.g., surface boundaries) of ultrasound liver image 60 for an extraction of an ultrasound liver mesh 61 from ultrasound liver image 60.

A stage S13 of flowchart 10 encompasses a registration of the preoperative anatomical image and the intraoperative anatomical image. More particularly, the identical topologies of the preoperative anatomical mesh and the intraoperative anatomical mesh derived from the known base topology of the anatomical mesh template establishes a mapping correspondence between the preoperative anatomical mesh and the intraoperative anatomical mesh that facilitates a spatial transformation of the preoperative anatomical image to the intraoperative anatomical image or vice-versa. Consequently, the preoperative anatomical image and the intraoperative anatomical image are registered for image-guidance purposes of an interventional/surgical/diagnostic procedure.

In practice, any technique(s) may be implemented for the registration of the preoperative anatomical image and the intraoperative anatomical image. In one embodiment of stage S13 as shown in FIG. 2, CT/MR liver mesh 51 and ultrasound liver mesh 61 have identical nodes and faces that facilitates a one-to-one registration 13 of CT/MR liver mesh 51 and ultrasound liver mesh 61 (e.g., a rigid, affine or elastic deformable transformation). Upon a termination of flowchart 10, a resulting registration of the preoperative anatomical image (e.g., CT/MR image 50 of FIG. 2) and the intraoperative anatomical image (e.g., ultrasound image 60 of FIG. 2) may be used for an image-guided interventional/surgical/diagnostic procedure.

Referring to FIG. 2, the exemplary embodiment of flowchart 10 employed a preoperative segmentation model (e.g., CT/MR segmentation model 11) and an intraoperative segmentation model (e.g., US segmentation model 12). FIGS. 3-6 will now be described herein for describing a construction method for a preoperative segmentation model and an intraoperative segmentation model.

Figure 3:
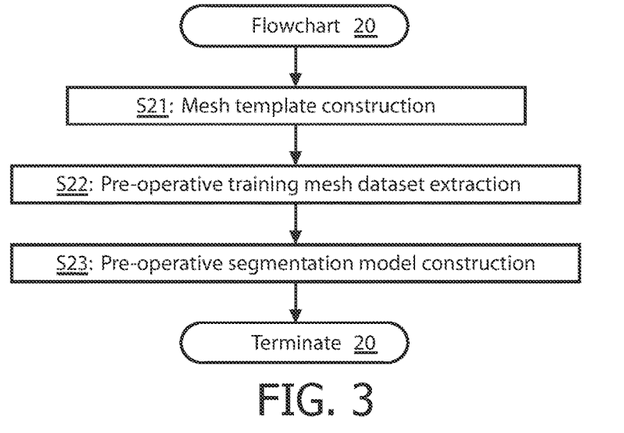
FIG. 3 illustrates a flowchart representative of an exemplary embodiment of a method for preoperative segmentation model construction in accordance with the present invention.

Referring to FIG. 3, a flowchart 20 represents a construction method for a preoperative segmentation model of the present invention.

Figure 4:
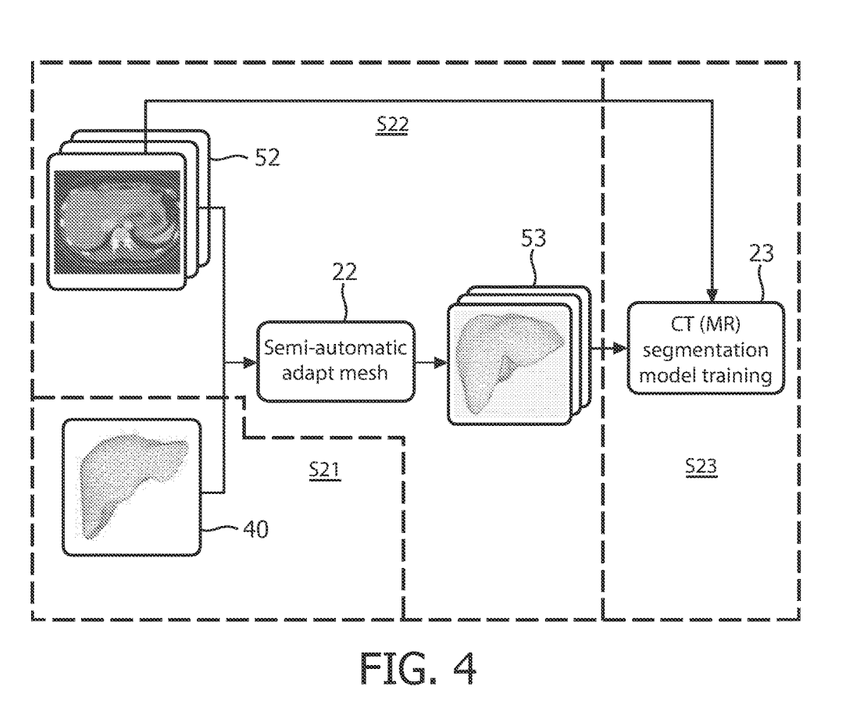
FIG. 4 illustrates an exemplary implementation of the flowchart illustrated in FIG. 3.

A stage S21 of flowchart 20 encompasses a construction of an anatomical mesh template across a general population of a j number of subjects, with j≥2, whereby the anatomical mesh template has a known base topology of a fixed number of vertices and faces. In practice, any technique(s) may be implemented for the construction of the anatomical mesh template. In one embodiment of stage S21, liver mesh template 40 as shown in FIG. 4 is constructed from an averaging of a general subject population of a j number of CT/MR segmented liver meshes of a liver. Liver mesh template 40 has a known base topology of a fixed number of vertices and faces, and is utilized for an initialization of a mesh segmentation of flowchart 10 as shown in FIG. 1.

A stage S22 of flowchart 20 encompasses an extraction of a preoperative training mesh dataset from a dataset of a k number of preoperative anatomical images across a general population of j subjects, with k≥2. In practice, any technique(s) may be implemented for the extraction of the preoperative training mesh dataset. In one embodiment of stage S22 as shown in FIG. 4, a CT/MR training mesh dataset 53 is extracted by a semi-automatic fitting 22 of liver mesh template 40 to image features (e.g., surface boundaries) of CT/MR liver image dataset 52.

In practice, the segmented anatomical meshes (not shown in FIG. 4) for construction of the anatomical mesh template and the preoperative anatomical image dataset for construction of the preoperative segmentation model (e.g., CT/MR liver image dataset 52 of FIG. 4) may be generated from one or more of the same subjects or generated from two (2) distinct sets of subjects.

A stage S23 of flowchart 20 encompasses a construction of a preoperative segmentation model from the preoperative training mesh dataset and the preoperative anatomical image dataset. In practice, any technique(s) may be implemented for the construction of the preoperative segmentation model. In one embodiment of stage S23 as shown in FIG. 4, a CT/MR segmentation model 23 is constructed from image features illustrated within the CT/MR liver image dataset 52 and from the known vertices and faces of CT/MR training mesh dataset 53. Upon termination of flowchart 20, CT/MR segmentation model 23 may serve as CT/MR segmentation model 11 as shown in FIG. 2.

Figure 5:
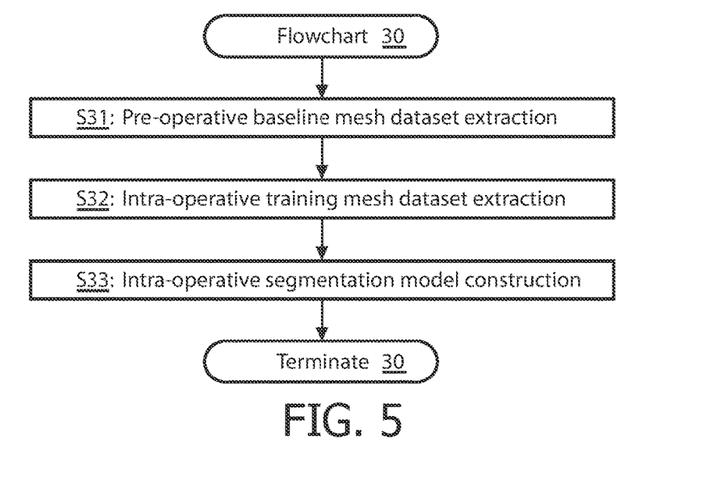
FIG. 5 illustrates a flowchart representative of an exemplary embodiment of a method for intraoperative segmentation model construction in accordance with the present invention.
Figure 6:
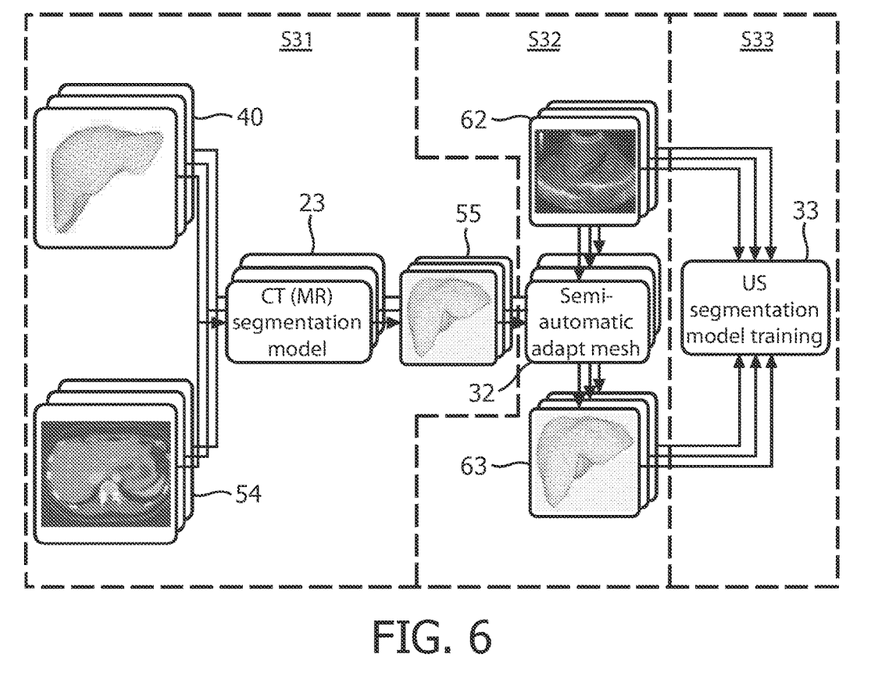
FIG. 6 illustrates an exemplary implementation of the flowchart illustrated in FIG. 5.

Referring to FIG. 5, a flowchart 30 represents a construction method for an intraoperative segmentation model of the present invention. A stage S31 of flowchart 30 encompasses an extraction of a preoperative baseline mesh dataset from a dataset of a i number of preoperative anatomical images across a general population of j subjects, with i≥2. In practice, any technique(s) may be implemented for the extraction of the preoperative baseline mesh dataset. In one embodiment of stage S31 as shown in FIG. 6, CT/MR segmentation model 23 (FIG. 4) semi-automatically fits liver mesh template 40 to image features (e.g., surface boundaries) of a CT/MR liver image dataset 54 for an extraction of a CT/MR baseline mesh dataset 55.

In practice, the preoperative anatomical image dataset for construction of the preoperative segmentation model (e.g., CT/MR liver image dataset 52 of FIG. 4) and the preoperative anatomical image dataset for construction of the intraoperative segmentation model (e.g., CT/MR liver image dataset 54 of FIG. 6) may be generated from one or more of the same subjects or generated from two (2) distinct sets of subjects.

A stage S32 of flowchart 30 encompasses an extraction of an intraoperative training mesh dataset from a dataset of an l number of intraoperative anatomical images across a general population of j subjects, l≥2. In practice, any technique(s) may be implemented for the extraction of the intraoperative training mesh dataset. In one embodiment of stage S32 as shown in FIG. 4, preoperative baseline mesh dataset 55 is spatially transformed to an ultrasound liver image dataset 62 by any known technique (e.g., a manual registration) and an ultrasound training mesh dataset 63 is extracted by a semi-automatic fitting 32 of preoperative baseline mesh dataset 55 to image features (e.g., surface boundaries) of ultrasound liver image dataset 62.

In practice, the preoperative anatomical image dataset (e.g., CT/MR liver image dataset 54) and the intraoperative anatomical image dataset (e.g., ultrasound live image dataset 62) may be generated from one or more of the same subjects or generated from two distinct sets of subjects.

A stage S33 of flowchart 30 encompasses a construction of the intraoperative segmentation model from the intraoperative training mesh dataset. In practice, any technique(s) may be implemented for the construction of the intraoperative segmentation model. In one embodiment of stage S33 as shown in FIG. 6, an ultrasound segmentation model 33 is constructed from image features (e.g., surface boundaries) illustrated within ultrasound liver image dataset 62 and from the known vertices and faces of ultrasound training mesh dataset 63. Upon termination of flowchart 30, ultrasound segmentation model 33 may serve as ultrasound segmentation model 12 as shown in FIG. 2.

Figure 7:
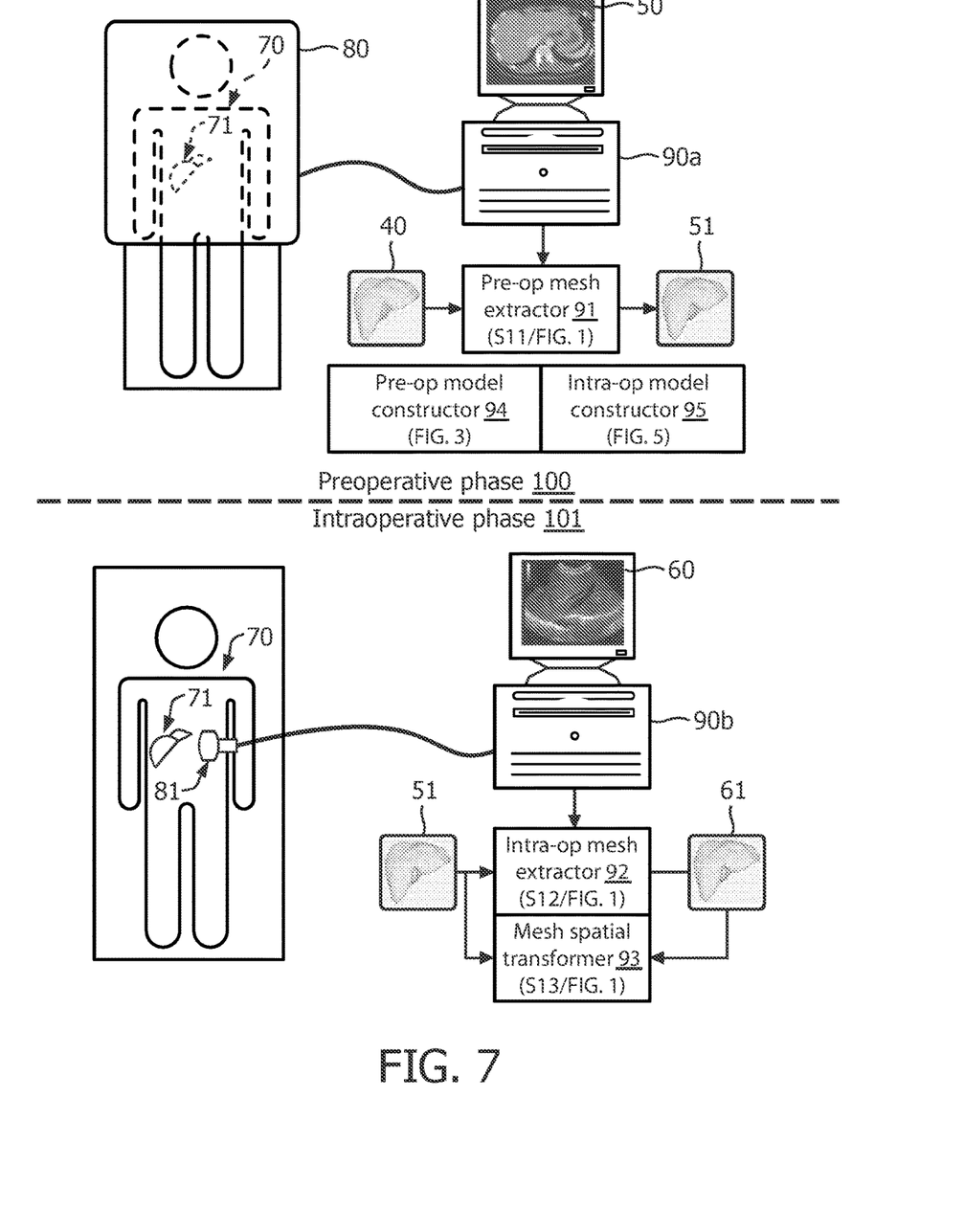
FIG. 7 illustrates an exemplary embodiment of a system and a modular network for multi-modal segmentation and registration in accordance with the present invention.

Referring to FIG. 7, a network of software/firmware modules 91-95 are shown for implementing flowchart 10 (FIG. 1), flowchart 20 (FIG. 3) and flowchart 30 (FIG. 5).

First, preoperative mesh extractor 91 employs technique(s) for extracting a preoperative anatomical mesh as encompassed by stage S11 of flowchart 10 (FIG. 1) and exemplarily shown with the extraction of CT/MR liver mesh 51 (FIG. 2).

Second, intraoperative mesh extractor 92 employs technique(s) for extracting an intraoperative anatomical mesh as encompassed by stage S12 of flowchart 10 (FIG. 1) and exemplarily shown with the extraction of ultrasound liver mesh 61 (FIG. 2).

Third, mesh spatial transformer 93 employs technique(s) for spatially transforming the preoperative anatomical mesh to the intraoperative anatomical mesh as encompassed by stage S13 of flowchart 10 (FIG. 1) and exemplarily shown with the spatial transformation of CT/R liver mesh 51 to ultrasound liver mesh 61 (FIG. 2).

Fourth, in support of modules 91 and 92, preoperative model constructor 94 employs technique(s) for constructing a preoperative segmentation model as encompassed by flowchart 20 (FIG. 3) and exemplarily shown with the construction of CT/MR segmentation model 23 (FIG. 4).

Finally, in support of modules 91 and 92, intraoperative model constructor 95 employs technique(s) for constructing an intraoperative segmentation model as encompassed by flowchart 30 (FIG. 5) and exemplarily shown with the construction of ultrasound segmentation model 33 (FIG. 6).

FIG. 7 further illustrates a system employing a preoperative workstation 90a and an intraoperative workstation 90b. In practice, preoperative workstation 90a and intraoperative workstation 90b may be physically independent workstations or logical substations physically integrated within a single workstation.

Preoperative workstation 90a is structurally configured with hardware/circuitry (e.g., processor(s), memory, etc.) for executing preoperative mesh extractor 91 programmed and installed as software/firmware within workstation 90a.

Intraoperative workstation 90b is structurally configured with hardware/circuitry (e.g., processor(s), memory, etc.) for executing intraoperative mesh extractor 92 and mesh spatial transformer 93 programmed and installed as software/firmware within workstation 90b.

In practice, preoperative model constructor 94 and intraoperative model constructor 95 may be programmed and installed as software/firmware within preoperative workstation 90a or within a training workstation (not shown) that is either a physically independent workstation or a logical substation physically integrated within preoperative workstation 90a.

In an exemplary system operation, during a training phase (not shown) prior to a preoperative phase 100 of an image guided interventional/surgical/diagnostic procedure, CT/MR segmentation model 11 (FIG. 4) and ultrasound segmentation model 12 (FIG. 6) are constructed respectively by modules 94 and 95. In practice, construction of segmentation models 11 and 12 may occur one time for numerous image guided interventional/surgical/diagnostic procedures.

During preoperative phase 100 of the image guided interventional/surgical/diagnostic procedure as shown in FIG. 7, a liver 71 of a subject 70 is scanned via a CT/MRI scanner 80 whereby preoperative mesh extractor 91 extracts CT/MR liver mesh 51 from CT/MR liver image 50 based on liver mesh template 40 having a known base topology of fixed number of vertices and faces.

During an intraoperative phase 101 of the image guided interventional/surgical/diagnostic procedure as shown in FIG. 7, liver 71 of subject 70 is imaged via an ultrasound probe 81 whereby intraoperative mesh extractor 92 extracts ultrasound liver mesh 61 from ultrasound liver image 60 based on CT/MR liver mesh 51 having a known topology of fixed number of vertices and faces identical to base topology of liver mesh template 40. Ultrasound liver mesh 61 has a known topology of fixed number of vertices and faces identical to base topology of liver mesh template 40 whereby mesh spatial transformer 93 spatially transform CT/MR liver mesh 51 to ultrasound liver mesh 61 for purposes of registering CT/MR liver image 50 to ultrasound live image 60.

Referring to FIGS. 1-7, those having ordinary skill in the art will appreciate numerous benefits of the present invention including, but not limited to, a mesh segmentation and a mesh registration that improves the overall workflow for image-guided interventional/surgical/diagnostic procedures by saving valuable time in the preoperative phase of the procedures and decreasing the human factor and subjectivity for aligning the preoperative and intraoperative anatomical images.

While various embodiments of the present invention have been illustrated and described, it will be understood by those skilled in the art that the embodiments of the present invention as described herein are illustrative, and various changes and modifications may be made and equivalents may be substituted for elements thereof without departing from the true scope of the present invention. In addition, many modifications may be made to adapt the teachings of the present invention without departing from its central scope. Therefore, it is intended that the present invention not be limited to the particular embodiments disclosed as the best mode contemplated for carrying out the present invention, but that the present invention includes all embodiments falling within the scope of the appended claims.

The invention claimed is:

1. A system for mesh registration, the system comprising:
a processor and a processor storage medium having instructions stored thereon, the processor configured by the instructions stored on the processor storage medium to:
   extract a preoperative anatomical mesh from a preoperative anatomical image based on a base topology of an anatomical mesh template;
   extract an intraoperative anatomical mesh from an intraoperative anatomical image based on a preoperative topology of the preoperative anatomical mesh derived from the base topology of the anatomical mesh template; and
   register the preoperative anatomical image and the intraoperative anatomical image based on a mapping correspondence between the preoperative anatomical mesh and the intraoperative anatomical mesh established by an intraoperative topology of the intraoperative anatomical mesh derived from the preoperative topology of the preoperative anatomical mesh.

2. The system of claim 1, wherein the processor is further configured by the instructions stored on the processor storage medium to generate both the preoperative anatomical image and the intraoperative anatomical image from an identical image modality.

3. The system of claim 1, wherein the processor is further configured by the instructions stored on the processor storage medium to generate the preoperative anatomical image and the intraoperative anatomical image from different image modalities.

4. The system of claim 1, wherein the processor is further configured by the instructions stored on the processor storage medium to:
   construct a preoperative segmentation model from an extraction of a preoperative training mesh dataset from a preoperative anatomical image dataset based on the base topology of the anatomical mesh template; and
   extract the preoperative anatomical mesh from the preoperative anatomical image based on the base topology of the anatomical mesh template.

5. The system of claim 1, wherein the processor is further configured by the instructions stored on the processor storage medium to:
construct an intraoperative segmentation model from an extraction of an intraoperative training mesh dataset from an intraoperative anatomical image dataset based on the preoperative topology of a preoperative baseline mesh dataset; and
utilize the intraoperative segmentation model to extract the intraoperative anatomical mesh from the intraoperative anatomical image based on the preoperative topology of the preoperative anatomical mesh.

6. The system of claim 5, wherein the processor is further configured by the instructions stored on the processor storage medium to extract the preoperative baseline mesh dataset from a preoperative anatomical image dataset based on the base topology of the anatomical mesh template.

7. The system of claim 1, wherein the processor is further configured by the instructions stored on the processor storage medium to register the preoperative anatomical image and the intraoperative anatomical image using a spatial transformation of the preoperative anatomical mesh to the intraoperative anatomical mesh.

8. A modular network for mesh segmentation and registration, the modular network comprising:
a processor and a processor storage medium having instructions stored thereon, the processor configured by the instructions stored on the processor storage medium to:
extract a preoperative anatomical mesh from a preoperative anatomical image based on a base topology of an anatomical mesh template;
extract an intraoperative anatomical mesh from an intraoperative anatomical image based on a preoperative topology of the preoperative anatomical mesh derived from the base topology of the anatomical mesh template; and
register the preoperative anatomical image and the intraoperative anatomical image based on a mapping correspondence between the preoperative anatomical mesh and the intraoperative anatomical mesh established by an intraoperative topology of the intraoperative anatomical mesh derived from the preoperative topology of the preoperative anatomical mesh.

9. The modular network of claim 8, wherein the processor is further configured by the instructions stored on the processor storage medium to generate both the preoperative anatomical image and the intraoperative anatomical image from an identical image modality.

10. The modular network of claim 8, wherein the processor is further configured by the instructions stored on the processor storage medium to generate the preoperative anatomical image and the intraoperative anatomical image from different image modalities.

11. The modular network of claim 8, wherein the processor is further configured by the instructions stored on the processor storage medium to:
construct a preoperative segmentation model from an extraction of a preoperative training mesh dataset from a preoperative anatomical image dataset based on the base topology of the anatomical mesh template; and
extract the preoperative anatomical mesh from the preoperative anatomical image based on the base topology of the anatomical mesh template.

12. The modular network of claim 8, wherein the processor is further configured by the instructions stored on the processor storage medium to:
construct an intraoperative segmentation model from an extraction of an intraoperative training mesh dataset from an intraoperative anatomical image dataset based on the preoperative topology of the preoperative baseline mesh dataset; and
extract the intraoperative anatomical mesh from the intraoperative anatomical image based on the preoperative topology of the preoperative anatomical mesh.

13. The modular network of claim 12, wherein the processor is further configured by the instructions stored on the processor storage medium to extract the preoperative baseline mesh dataset from a preoperative anatomical image dataset based on the base topology of the anatomical mesh template.

14. The modular network of claim 8, wherein the processor comprises a plurality of processors,
wherein a first of the plurality of processors is configured to extract the preoperative anatomical mesh and comprises a portion of a preoperative workstation;
wherein a second of the plurality of processors is configured to extract the intraoperative anatomical mesh and is configured to register the preoperative anatomical image and the intraoperative anatomical image; and
wherein the second of the plurality of processors comprises a portion of an intraoperative workstation.

15. The modular network of claim 8, wherein the processor is further configured by the instructions stored on the processor storage medium to register the preoperative anatomical image and the intraoperative anatomical image using a spatial transformation of the preoperative anatomical mesh to the intraoperative anatomical mesh.

16. A system for mesh registration, the system comprising:
a processor and a processor storage medium having instructions stored thereon, the processor configured by the instructions stored on the processor storage medium to perform acts:
extracting a preoperative anatomical mesh from a preoperative anatomical image based on a base topology of an anatomical mesh template;
extracting an intraoperative anatomical mesh from an intraoperative anatomical image based on a preoperative topology of the preoperative anatomical mesh derived from the base topology of the anatomical mesh template; and
registering the preoperative anatomical image and the intraoperative anatomical image based on a mapping correspondence between the preoperative anatomical mesh and the intraoperative anatomical mesh established by an intraoperative topology of the intraoperative anatomical mesh derived from the preoperative topology of the preoperative anatomical mesh.

* * * * *